United States Patent

Takeda et al.

[11] Patent Number: 5,393,815
[45] Date of Patent: Feb. 28, 1995

[54] SILAZANE-BASED, HEAT RESISTANT, DIELECTRIC COATING COMPOSITIONS

[75] Inventors: Yoshihumi Takeda; Toshinobu Ishihara; Hiromi Ohsaki, all of Jouetsu, Japan

[73] Assignee: Shin-Etsu Chemical Co., Ltd., Tokyo, Japan

[21] Appl. No.: 95,353

[22] Filed: Jul. 20, 1993

Related U.S. Application Data

[63] Continuation of Ser. No. 779,360, Oct. 17, 1991, abandoned.

[30] Foreign Application Priority Data

Oct. 17, 1990 [JP] Japan ................... 2-278483

[51] Int. Cl.⁶ ............................... C08K 5/24
[52] U.S. Cl. ................... 524/262; 524/588; 524/404; 524/430; 524/431; 524/433; 524/432; 524/443
[58] Field of Search ............... 524/588, 404, 430, 431, 524/433, 432, 443, 262

[56] References Cited

U.S. PATENT DOCUMENTS

| | | |
|---|---|---|
| 4,298,558 | 11/1981 | Baney et al. ................... 524/588 |
| 4,344,800 | 8/1982 | Lutz ................... 524/588 |
| 4,384,068 | 5/1983 | Bouverot et al. ................... 524/588 |
| 4,387,195 | 6/1983 | Tully et al. ................... 524/588 |
| 4,657,991 | 10/1987 | Takamizawa et al. ................... 524/267 |
| 4,879,334 | 11/1989 | Hasegawa et al. ................... 524/66 |
| 4,939,197 | 7/1990 | Su ................... 524/489 |
| 5,049,528 | 9/1991 | Moffatt ................... 524/435 |
| 5,063,267 | 11/1991 | Hanneman et al. ................... 524/588 |

OTHER PUBLICATIONS

"Organosilicon Compounds", C. Eaborn, Ph.D., D.Sc., Acedemic Press Inc., 1960, p. 454.

Primary Examiner—Melvyn I. Marquis
Assistant Examiner—Karen A. Dean
Attorney, Agent, or Firm—McAulay Fisher Nissen Goldberg & Kiel

[57] ABSTRACT

By blending a silazane with an organic silicon polymer such as polycarbosilane and polysilazane and inorganic powder such as alumina and silica, there is obtained a coating composition which can be applied and baked onto metallic and non-metallic substrates to form dielectric coatings which are improved in many properties including substrate adhesion, hardness, electrical insulation, heat resistance, water resistance, and chemical resistance.

3 Claims, No Drawings

SILAZANE-BASED, HEAT RESISTANT, DIELECTRIC COATING COMPOSITIONS

This is a continuation of application Ser. No. 07/779,360, filed Oct. 17, 1991, now abandoned.

This invention relates to heat resistant, dielectric coating compositions, and more particularly, to coating compositions capable of forming dielectric coatings having improved adhesion and heat resistance.

BACKGROUND OF THE INVENTION

There is an increasing demand for coatings on metallic and non-metallic substrates subject to elevated temperatures for protecting the substrates against oxidation and corrosion. Polyorganosiloxane base coating compositions are known to be more heat resistant than conventional organic polymer coatings such as polyester and polyimide coatings. However, even polyorganosiloxane coatings could not withstand temperatures as high as 400° C. or higher in an air atmosphere for a long time and were likely to peel off under such conditions.

Several heat resistant coating compositions have been proposed. For example, Japanese Patent Application Kokai (JP-A) No. 54768/1987 discloses a composition comprising polytitanocarbosilane, silicone resin, and inorganic filler; JP-A 235370/1987 discloses a composition comprising polycarbosilane, silicone resin, and inorganic filler; JP-A 92969/1990 discloses a blend of an organometallic polymer and silicon dioxide; and Japanese Patent Publication (JP-B) No. 50658/1983 discloses the use of a borosiloxane polymer. However, these coating compositions had poor electrical properties at elevated temperatures. Especially the last-mentioned composition experienced a loss of water resistance and electrical properties at elevated temperatures. These compositions could not meet all the requirements of coating hardness, heat resistance, electrical insulation, and solvent resistance.

There is a need for a coating composition capable of forming coatings which can meet many requirements including adhesion, heat resistance, coating hardness, and electrical insulation.

SUMMARY OF THE INVENTION

Therefore, an object of the present invention is to provide a coating composition capable of forming coatings having improved adhesion to metallic and non-metallic substrates and exhibiting improved heat resistance, hardness, electrical insulation, water resistance, chemical-resistance, and solvent resistance.

The inventors have discovered that by blending a silazane compound with an organic silicons polymer and inorganic powder, there is obtained a heat resistant, dielectric coating composition capable of forming coatings which can adhere to metallic and non-metallic substrates, are resistant against heat, typically temperatures of 400° C. or higher in air for a long period of time, and exhibit improved hardness, electrical insulation, water resistance, chemical resistance, and solvent resistance.

Therefore, the present invention provides a heat resistant, dielectric coating composition comprising an organic silicon polymer, a silazane compound, and inorganic powder.

DETAILED DESCRIPTION OF THE INVENTION

A first essential component of the heat resistant, dielectric coating composition according to the present invention is an organic silicon polymer which is preferably selected from polycarbosilanes and polysilazanes.

The polycarbosilanes are known from JP-B 26527/1982 (or U.S. Pat. No. 4,052,430, DE 2618246, FR 2308650 and GB 1551952), for example. Such polycarbosilanes may be synthesized, for example, by reacting dimethyldichlorosilane with metallic sodium and subjecting the resulting polysilanes to pyrolytic polymerization.

The polysilazanes are known from the following patent publications and applications, all by Shin-Etsu Chemical Co., Ltd.

(1) JP-A 290730/1987 which corresponds to U.S. Pat. No. 4,771,118 and 4,870,035, FR 2,599,745 and DE 3,719,343 A1 and discloses a process for manufacturing an organic silazane polymer which comprises reacting ammonia with a mixture of methyldichlorosilane, methyltrichlorosilane and dimethyldichlorosilane to obtain an ammonolysis product, and polymerizing the ammonolysis product in the presence of a basic catalyst capable of deprotonation to obtain an organic silazane polymer. Preferably, the mixing ratios of methyldichlorosilane, methyltrichlorosilane and dimethyldichlorosilane are in ranges of 55 to 80 mol %, 10 to 30 mol % and 5 to 25 mol %, respectively.

(2) JP-A 117037/1988 and 193930/1988 which correspond to U.S. Pat. No. 4,869,854, FR 2,606,777 and DE 3,736,914 A1 and discloses a process for manufacturing an organic silazane polymer which comprises:

reacting ammonia with a mixture consisting of at least one compound selected from the group consisting of organic silicon compounds of the formula;

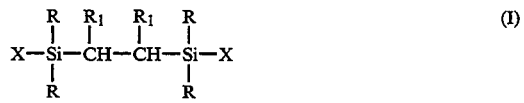

at least one compound selected from the group consisting of organic silicon compounds of the following formula;

and at least one compound selected from the group consisting of organic silicon compounds of the following formula; (III);

in which R represents hydrogen, chlorine, bromine, methyl radical, ethyl radical, phenyl radical or vinyl radical; $R_1$ represents hydrogen or methyl radical, $R_2$ represents hydrogen, methyl radical, ethyl radical, phenyl radical or vinyl radical and x represents chlorine or bromine, to obtain an ammonolysis product, the mixing ratios of the organic silicon compounds shown by the above formulae (I), (II), and (III) being in ranges of 1 to 25 mol %, 1 to 25 mol %, and 50 to 80 mol %, respectively, and polymerizing the ammonolysis product in the presence of a basic catalyst capable of deprotonation to obtain an organic silazane polymer. Preferably, the amounts of hydrogen, vinyl radical and alkyl or phenyl radical in $R_2$ of the organic silicon compounds of the formulae (I) and (II) are in ranges of 55 to 90 mol %, 0 to 30 mol % and 0 to 30 mol %, respectively.

(3) JP - A 210133/1988 which corresponds to US 4,847,345, FR 8802317 and DE 3805796 A and discloses a process for manufacturing an organic silazane polymer which comprises reacting an organic silicon compound of the following formula (I):

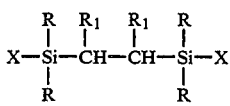
(I)

in which R represents hydrogen, chlorine, bromine, methyl radical, ethyl radical, phenyl radical or vinyl radical, $R_1$ represents hydrogen or methyl radical and X represents chlorine or bromine, or a mixture of an organic silicon compound of the formula (I) above and an organic silicon compound of the following formula (II):

(II)

in which $R_2$ and $R_3$ represent hydrogen, chlorine, bromine, methyl radical, ethyl radical, phenyl radical or vinyl radial and X represents chlorine or bromine with a disilazane of the following formula (III):

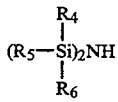
(III)

in which $R_4$, $R_5$, $R_6$ represents hydrogen, methyl radical, ethyl radical, phenyl radical or vinyl radical in an anhydrous state at a temperature of from 25° C. to 350° C. while distilling off by-produced organic ingredients out of the system to obtain an organic silazane polymer.

Preferably, the mixing ratio of the organic silicon compounds shown by the above formulae (I) and (II) is in the range of 50 to 100 mol %: To 50 mol %.

(4) JP-A 153730/1989 which discloses a method for preparing an organic silazane polymer comprising the steps of: reacting ammonia with a mixture of an organic silicon compound of the following formula (I):

(I)

in which R represents-methyl radical, ethyl radical or phenyl radical and X represents chlorine or bromine, and an organic silicon compound of the following formula (II):

(II)

in which R represents methyl radical, ethyl radical or phenyl radical, $R_1$ represents hydrogen or vinyl radial and X represents chlorine or bromine, in a mixing ratio of the compounds (I) and (II) ranging from 20:80 to 90:10 (mol %) to obtain a silazane compound, and polymerizing the silazane compound in the presence of an alkali catalyst to obtain an organic silazane polymer.

(5) JP-A 50238/1991, 51315/1991 and 51316/1991 which correspond to U.S. Ser. No. 07/554,129 and EP 409146 A2 and disclose a method for preparing an organic silazane polymer, comprising the steps of:

passing a silazane compound in vapor form through a hollow tube heated at a temperature in the range of from 400° to 700° C. for activating the silazane compound, and thermally polymerizing the silazane compound in a liquid phase. Preferably the silazane compound has the following formula (I) or (II):

$(CH_3)_3Si-NH-Si(CH_3)_3$     (I)

(II)

(6) JP-A 81330/1991 which corresponds to U.S. Ser. No. 07/571,132 and EP 417562 A2 and discloses a method for preparing a polytitanocarbosilazane polymer comprising the step of reacting (A) an organic silicon compound of the general formula:

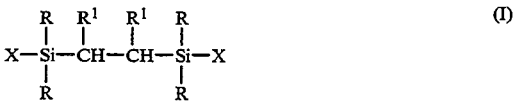
(I)

wherein R is selected from the group consisting of hydrogen, chloro, bromo, methyl, ethyl, phenyl and vinyl radicals, $R^1$ is hydrogen or a methyl radical, and X is chloro or bromo, (B) an organic silicon compound of the general formula:

(II)

wherein $R^2$ and $R^3$ are independently selected from the group consisting of hydrogen, chloro, bromo, methyl, ethyl, phenyl and vinyl radicals, and X is chloro or bromo, (C) a titanium compound, and (D) a disilazane of the general formula:

(III)

wherein $R^4$, $R^5$, and $R^6$ are independently selected from the group consisting of hydrogen, methyl, ethyl, phenyl and vinyl radicals. Preferably, the compounds of formulae (I) and (II) are mixed in a molar ratio (I) /(II) of from 10/90 to 40/60. The titanium compound is used in an amount of 1 to 10 mol % based on the total of the organic silicon compounds of formulae (I) and (II). The disilazane of formula (III) is used in at least equimolar amount to the total of components (A), (B), and (C).

(7) JP-A 190933/1991 which corresponds to U.S. Patent No. 5,200,371 and EP 434031 A2 and discloses a method for preparing an organic silazane polymer comprising the steps of:

reacting an organic silicon compound of formula (I):

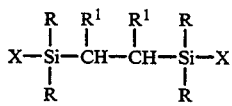

(I)

wherein R is selected from the class consisting of hydrogen, chloro, bromo, methyl, ethyl, phenyl, and vinyl, $R^1$ is hydrogen or methyl, and X is chloro or bromo, or a mixture of an organic silicon compound of formula (I) and an organic silicon compound of formula (II):

(II)

wherein $R^2$ and $R^3$ are independently selected from the class consisting of hydrogen, chloro, bromo, methyl, ethyl, phenyl, and vinyl, and X is chloro or bromo, with a disilazane of formula (II):

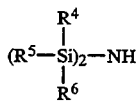

(III)

wherein $R^4$, $R^5$ and $R^6$, are independently selected from the class consisting of hydrogen, methyl, ethyl, phenyl and vinyl, at a temperature of 25° to 350° C. in an anhydrous atmosphere, and reacting the resulting organic silazane polymer with ammonia, thereby reducing the residual halogen in the polymer.

(8) JP-A 190932(1991) which discloses a method of preparing a hafnium-containing silazane polymer comprising reacting (A) a halogenated organic silicon compound such as those described above, (B) a hafnium compound of the following formula (I):

(I)

in which X represents chlorine or bromine, and (C) a disilazane of the following formula (II)

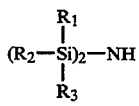

(II)

in which $R_1$, $R_2$ and $R_3$ are independently selected from hydrogen, methyl radical, ethyl radical, phenyl radical and vinyl radical.

In the present invention, the polycarbosilanes and the polysilazanes are used as the organic silicon polymers as described above.

Since the degree of polymerization of the organic silicon polymer largely affects coating performance, especially coating crack resistance, the polycarbosilanes should preferably have a number average molecular weight of about 500 to 5,000, more preferably from about 600 to about 2,000, most preferably from about 650 to about 1,200, and the polysilazanes preferably have a number average molecular weight of about 400 to about 3,000, more preferably from about 500 to about 2,000, most preferably from about 550 to about 1,200. Below the lower limit of number average molecular weight, the resulting composition would poorly adhere to substrates. Above the upper limit, cracks would occur in the resulting coatings which could be peeled off during subsequent baking.

The organic silicon polymers may be used alone or in admixture of two or more. Preferably the composition contains about 5 to 50% by weight, more preferably about 15 to 30% by weight of the organic silicon polymer based on the total weight of the composition (organic silicon polymer plus silazane compound plus inorganic powder). Less than 5% by weight of the organic silicon polymer would sometimes be too small to provide the composition with satisfactory heat resistance, adhesion, and coating hardness whereas more than 50% would sometimes form coatings susceptible to cracking and peeling after baking.

The organic silicon polymer component is generally converted into SiC, $Si_3N_4$ and the like by subsequent baking of coatings in an inert gas such as nitrogen and argon. If coatings are baked in air, then the organic silicon polymer component is converted into a ceramic material consisting essentially of SiC, $Si_3N_4$ and $SiO_2$, ensuring that the present composition form fully heat resistant coatings.

A second essential component is a silazane compound which is preferably selected from tetramethyldisilazane, hexamethylcyclotrisilazane, octamethylcyclotetrasilazane and other silazanes, and mixtures thereof.

Preferably the composition contains about 5 to 40% by weight, more preferably about 10 to 30% by weight of the silazane compound based on the total weight of the composition. Less than 5% by weight of the silazane compound would sometimes fail to provide electrical insulation whereas more than 40% would sometimes result in a loss of coating hardness and adhesion.

A third essential component is inorganic powder, for example, $Al_2O_3$, $SiO_2$, $Fe_2O_3$, $TiO_2$, $MgO$, $ZrO_2$—$SiO_2$, $3Al_2O_3 \cdot 2SiO_2$ $ZnO$—$MgO$, $Si_3N_4$, $SiC$ and $BN$ alone or in admixture of two or more. The inorganic powder preferably has a mean particle size of from about 0.1 to about 30 μm, more preferably from about 1 to about 5 μm although the particle size is not critical.

Preferably, the composition contains about 10 to 70% by weight, more preferably about 30 to 60% by weight of the inorganic powder based on the total weight of the composition. Less than 10% by weight of the inorganic powder would sometimes result in defective coatings often having pinholes whereas more than 70% by weight would be detrimental to adhesion.

Other additives may be added to the composition insofar as the benefits of the present invention are maintained.

The coating composition of the present invention comprising the aforementioned organic silicon polymer, silazane compound, and inorganic powder as essential components may be applied by dissolving and dispersing the components in organic solvents, for example, hexane, benzene, toluene, xylene, and N-methylpyrrolidone. Such a coating composition in dispersion form is applicable to a surface of substrates, for example, conventionally surface-treated metallic members by conventional techniques such as brushing, spraying, flow coating, dipping, and roll coating and then baked into coatings.

In general, the resulting coatings have a thickness of from about 20 to 150 $\mu m$, preferably from about 30 to 100 $\mu m$. Often, coatings of less than about 20 $\mu m$ thick are likely to contain pinholes which are detrimental to corrosion resistance whereas more than 150 $\mu m$ thick coatings could partially separate from the substrates upon baking.

Baking is desirably carried out in air at temperatures of 200° C. or higher for about 15 to 60 minutes. Baking temperatures of below 200° C. would fail to form strong, hard coatings in some cases. It will be understood that a baking step may be omitted if coated articles are to be placed in an environment where they encounter a temperature of 200° C. or higher. Preferred baking process includes pre-baking at a temperature of up to 250° C. for about 15 to 30 minutes and baking at a temperature of 400° to 700° C. for about 15 to 60 minutes.

There has been described a heat resistant, dielectric coating composition comprising an organic silicone polymer, a silazane compound, and inorganic powder, capable of forming coatings which can strongly adhere to metallic and non-metallic substrates, are resistant against heat, typically temperatures of 400° C. or higher, and exhibit improved hardness, electrical insulation, water resistance, chemical resistance, and solvent resistance. Accordingly, the present coating composition is useful as coatings on metallic members for protecting them from corrosion and oxidation, and as heat resistant, dielectric coatings on conductors which are now of great interest.

EXAMPLE

Examples of the present invention are given below together with comparative examples by way of illustration and not by way of limitation.

First, it is described how to synthesize the organic silicon polymers used in the Examples.

Synthesis 1

A 5-liter three-necked flask was charged with 2.5 liters of dry xylene and 400 grams of sodium and heated to the boiling point of xylene in a nitrogen gas stream whereupon 1 liter of dimethyldichlorosilane was added dropwise to the flask over one hour. At the completion of dropwise addition, the contents were heated under reflux for 8 hours whereupon a precipitate formed. The precipitate was collected by filtration, washed with methanol, and washed further with water, obtaining 400 grams of polydimethylsilane in white powder form. The entire amount of polydimethylsilane was admitted into, an autoclave equipped with a gas inlet tube, stirrer, condenser, and distilling tube wherein reaction was effected at a temperature of 450° C. and a pressure of 5 kg/cm$^2$ G, obtaining a polycarbosilane. This product designated Polycarbosilane A had a number average molecular weight of 1,250.

Synthesis 2

The procedure of Synthesis 1 was repeated except that reaction was effected in the autoclave at a temperature of 430° C. and a pressure of 5 kg/cm$^2$ G, obtaining a polycarbosilane. This product designated Polycarbosilane B had a number average molecular weight of 900.

Synthesis 3

A 1-liter four-necked flask equipped with a stirrer, thermometer, ammonia inlet tube, and intensely cooled condenser was charged with 850 ml of hexane, then with 43.1 grams of methyldichlorosilane, 11.0 grams of methyltrichlorosilane, 6.5 grams of dimethyldichlorosilane and cooled to $-20°$ C. Excess ammonia gas (NH3) was introduced into the liquid at a rate of 12 liters/hour over 4 hours. With the condenser replaced by an air cooled condenser for allowing unreacted NH$_3$ to escape, the reaction mixture was allowed to warm up to room temperature. Then, ammonium chloride by-product was removed from the reaction mixture by filtration, and the hexane was stripped off from the filtrate under a vacuum of 1 mmHg at 60° C., obtaining 26 grams of liquid silazane.

Thereafter, a 300-ml three-necked flask equipped with a stirrer, thermometer, and dropping funnel was charged with 0.2 grams of potassium hydride and 125 ml of tetrahydrofuran in a dry box. The flask was taken out of the dry box and connected to a nitrogen inlet tube. While the mixture was stirred at room temperature for dispersing KH, 10 grams of the product from the ammonolysis step in 75 ml of tetrahydrofuran was slowly added to the mixture over 15 minutes through the dropping funnel. During addition of the ammonolysis product, evolution of a large amount of gas was observed, but ceased after one hour. The addition of 3 grams of methyl iodide formed a white precipitate of KI. After stirring for a further 30 minutes, the tetrahydrofuran solvent was almost removed in vacuum and 80 ml of hexane was added to the residual white slurry. The mixture was passed through a filter and the filtrate was removed of the hexane under a vacuum of 1 mmHg at 70° C. obtaining 9.1 grams of a silazane polymer in viscous solid form. This product designated Polysilazane C had a number average molecular weight of 1,020.

Synthesis 4

A dry 300-ml four-necked flask equipped with a stirrer, thermometer, gas inlet tube, and condenser was charged with 131.6 grams of dry toluene, and then with 25.7 grams (0.17 mol) of methyltrichlorosilane and 89.8 grams (0.83 mol) of trimethylchlorosilane. Ammonia gas was introduced into the solution at room temperature at a rate of 60 liters/hour over one hour (total amount of NH$_3$ added 2.68 mol). With stirring, the reaction mixture was aged for one hour at room temperature until the reaction was complete. Then, ammonium chloride by-product was removed from the reaction mixture by filtration and washed with 132 grams of toluene. From the combined filtrate, the toluene and hexamethyldisilazane by-product were stripped off at 120° C. and 30 Torr, obtaining 19.9 grams of a colorless transparent silazane compound. It had a molecular weight of 436.

Thereafter, a 100-ml flask equipped with a stirrer, thermometer, condenser, and gas inlet tube was charged with 15 grams of the silazane compound and purged with nitrogen gas before it was slowly heated. A low molecular weight fraction distilled out when the temperature reached 270° C. The temperature was further raised to 300° C, at which the reactor was maintained for 2 hours. Then the reactor was cooled down, obtaining 8.25 grams of a lightly yellow solid. This product designated Polysilazane D had a number average molecular weight of 1,070.

Examples 1-7

Dielectric coating compositions were prepared by dissolving and dispersing the organic silicon polymer, silazane compound and inorganic powder shown in the following Table in an organic solvent. Using a bar coater, the coating compositions were applied to stainless steel pieces of 50 mm×50 mm×3 mm thick which had been polished with #240 sand paper and cleaned off oily matter. The coatings of 60μm thick were then pre-baked in air at 250° C. for 30 minutes and finally baked at 700° C. for 30 minutes.

and counting the number of the remaining coating sections.

(3) Insulation

Electric resistance was measured by applying DC 500 V according to JIS C-1303.

(4) Heat resistance

The test piece was heated at 600° C. in air for 1000 hours and then cooled down. The coating was examined for the presence of cracks or separation.

(5) Water resistance

The test piece was immersed in water at 80° C. for 1000 hours before the coating was examined for cracking or separation.

(6) Alkali resistance

The test piece was immersed in 10% NaOH aqueous solution for 1000 hours before the coating was examined.

(7) Corrosion resistance

The test piece was immersed in 10% HCl aqueous solution for 1000 hours before the coating was examined for cracking or separation.

(8) Solvent resistance

The test piece was immersed in xylene for 1000 hours before the coating was examined for cracking or separation.

TABLE

| Composition (pbw) | | 1 | 2 | 3 | 4 | 5 | 6 | 7 | Comparative 1 | Comparative 2 |
|---|---|---|---|---|---|---|---|---|---|---|
| Organic silicon polymer | Polycarbosilane A | 20 | 10 | | | 15 | | | 20 | 10 |
| | Polycarbosilane B | | | 20 | 10 | | 5 | | | |
| | Polysilazane C | | 10 | | | | | | | 20 |
| | Polysilazane D | | | | 10 | | 15 | 15 | | |
| Silazane compound | Tetramethyldisilazane | 5 | | | | 10 | | | | |
| | Hexamethylcyclotrisilazane | | 20 | 10 | 10 | | 10 | 5 | | |
| | Octamethylcyclotetrasilazane | | | | | | | 10 | | |
| Inorganic powder | $Al_2O_3$ | 40 | 40 | 35 | | | 50 | | 50 | 20 |
| | $SiO_2$ | | | 5 | | | | | | 20 |
| | $Si_3N_4$ | | | | 50 | | | | | |
| | BN | | | | | 45 | | | | |
| | $TiO_2$ | | | | | | | 40 | | |
| Solvent | Xylene | 35 | 20 | | 20 | | 20 | 30 | 30 | 30 |
| | Toluene | | | 30 | | 30 | | | | |
| Baking conditions | Pre-baking (°C. × min.) | 250 × 30 | ← | ← | ← | ← | ← | ← | ← | ← |
| | Baking (°C. × min.) | 700 × 30 | ← | ← | ← | ← | ← | ← | ← | ← |
| Coating properties | Hardness | 9H | 6H | 8H | 7H | 7H | 7H | 8H | 8H | 2H |
| | Adhesion | Good | ← | ← | ← | ← | ← | ← | * | ← |
| | Insulation, Ω·cm | $10^{10}$ | $10^{10}$ | $10^{11}$ | $10^{10}$ | $10^{10}$ | $10^{10}$ | $10^{11}$ | $10^5$ | $10^5$ |
| | Heat resistance | Good | ← | ← | ← | ← | ← | ← | * | ← |
| | Water resistance | Good | ← | ← | ← | ← | ← | ← | ← | ← |
| | Alkali resistance | Good | ← | ← | ← | ← | ← | ← | ← | ← |
| | Corrosion resistance | Good | ← | ← | ← | ← | ← | ← | * | ← |
| | Solvent resistance | Good | ← | ← | ← | ← | ← | ← | ← | ← |

*Some separation

For comparison purposes, coating compositions were prepared from the organic silicon polymer and inorganic powder, but without blending the silazane compound. The compositions were similarly applied to stainless steel pieces followed by baking.

The coated steel pieces were examined for performance by the following tests.

(1) Coating hardness

A pencil scratch test was carried out according to JIS K-5400, determining the pencil hardness at which a scratch was marked on the coating.

(2) Adhesion

Adhesion was examined according to JIS K-5400 by scribing the test piece coating surface at spacings of 1 mm, applying adhesive tape thereto, stripping the tape, As is evident from the data shown in the Table, the dielectric, heat-resistant coating compositions of Examples were applied and baked into coatings which were improved in many properties including adhesion to substrates, harness, insulation, heat resistance, water resistance, and chemical resistance.

Although some preferred embodiments have been described, many modifications and variations may be made thereto in the light of the above teachings. It is therefore to be understood that within the scope of the appended claims, the invention may be practiced otherwise than as specifically described.

We claim:

1. A coating composition capable of forming a dielectric coating having improved adhesion and heat resistance comprising:

an organic silicon polymer selected from the group consisting of polycarbosilanes having a number average molecular weight of about 600 to 2,000 and polysilazanes having a number average molecular weight of about 500 to about 2,000, a silazane compound selected from the group consisting of tetramethyldisilazane, hexamethylcyclotrisilazane, octamethylcyclo tetrasilazane and mixtures thereof, and an inorganic powder having a mean particle size of from about 0.1 to about 30μm, said composition comprising, based on the total weight of the composition, about 5 to about 50% by weight of the organic silicon polymer about 5 to about 40% by weight of the silazane compound, and about 10 to about 70% by weight of the inorganic powder.

2. The coating composition of claim 1 wherein the polycarbosilane has a number average molecular weight of about 650 to 1,200 and the polysilazane has a number average molecular weight of about 550 to 1,200.

3. The coating composition of claim 1 wherein the composition comprises, based on the total weight of the composition, about 15 to 30% by weight of the organic silicon polymer, about 10 to 30% by weight of the silazane compound, and about 30 to 60% by weight of the inorganic powder.

* * * * *